(12) United States Patent
Mei et al.

(10) Patent No.: US 10,078,335 B2
(45) Date of Patent: Sep. 18, 2018

(54) RAY TRACING FOR HIDDEN OBSTACLE DETECTION

(71) Applicant: Toyota Motor Engineering & Manufacturing North America, Inc., Erlanger, KY (US)

(72) Inventors: Xue Mei, Ann Arbor, MI (US); Katsuhiro Sakai, Ann Arbor, MI (US); Nobuhide Kamata, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/195,744

(22) Filed: Jun. 28, 2016

(65) Prior Publication Data

US 2017/0371346 A1 Dec. 28, 2017

(51) Int. Cl.
*G05D 1/02* (2006.01)

(52) U.S. Cl.
CPC ........... *G05D 1/0248* (2013.01); *G05D 1/024* (2013.01); *G05D 1/0274* (2013.01); *G05D 2201/0213* (2013.01)

(58) Field of Classification Search
None
See application file for complete search history.

(56) References Cited

U.S. PATENT DOCUMENTS 8,589,014 B2   11/2013 Fairfield et al.
9,164,511 B1   10/2015 Ferguson et al.
9,216,745 B2   12/2015 Beardsley et al.
(Continued)

FOREIGN PATENT DOCUMENTS

JP   11149557 A       6/1999
JP   2009301400 A   12/2009
JP   2012238151 A   12/2012

OTHER PUBLICATIONS

Petrovskaya et al., "Model Based Vehicle Detection and Tracking for Autonomous Urban Driving", retrieved from the Internet: <http://cs.stanford.edu/group/manips/publications/pdfs/Petrovskaya_2009_AURO.pdf>, [retrieved Apr. 12, 2016], published online Apr. 1, 2009 (17 pages).

(Continued)

*Primary Examiner* — Mussa A Shaawat
*Assistant Examiner* — Kyung J Kim
(74) *Attorney, Agent, or Firm* — Christopher G. Darrow; Darrow Mustafa PC

(57) ABSTRACT

Ray tracing can be used to detect hidden obstacles in an external environment of a vehicle. An outbound sensor signal can be transmitted into an external environment of the vehicle. The outbound sensor signal can be a LIDAR sensor signal. If a return sensor signal is not received for the outbound sensor signal, it can be determined whether an obstacle is located along a projected path of the outbound sensor signal. Such a determination can be made using one or more maps, such as a terrain map and/or a static obstacle map. Responsive to determining that an obstacle is located along the projected path of the outbound sensor signal, a driving maneuver for the vehicle relative to the obstacle can be determined. The vehicle can be caused to implement the determined driving maneuver.

26 Claims, 5 Drawing Sheets

(56) References Cited

U.S. PATENT DOCUMENTS

| | | | |
|---|---|---|---|
| 9,432,929 | B1 | 8/2016 | Ross et al. |
| 2012/0310466 | A1* | 12/2012 | Fairfield ............... G05D 1/024 |
| | | | 701/28 |
| 2012/0316725 | A1 | 12/2012 | Trepagnier et al. |
| 2014/0139676 | A1 | 5/2014 | Wierich |
| 2014/0330456 | A1 | 11/2014 | Lopez Morales et al. |
| 2015/0045994 | A1 | 2/2015 | Krishna et al. |
| 2015/0272413 | A1* | 10/2015 | Miyake ................. A47L 11/38 |
| | | | 701/23 |
| 2015/0334269 | A1 | 11/2015 | Yokota et al. |
| 2016/0221500 | A1 | 8/2016 | Sakai et al. |
| 2017/0185089 | A1 | 6/2017 | Mei et al. |

OTHER PUBLICATIONS

Petrovskaya, "Towards Dependable Robotic Perception", A Dissertation Submitted to the Department of Computer Science and the Committee on Graduate Studies of Stanford University, Jun. 2011 (226 pages).

Vu et al., "Online Localization and Mapping with Moving Object Tracking in Dynamic Outdoor Environments", IEEE Intelligent Vehicles Symposium, Istanbul, Turkey, Jun. 13-15, 2007, pp. 190-195 (6 pages).

Montemerlo et al., "Junior: The Stanford Entry in the Urban Challenge", retrieved from the Internet: <http://robots.stanford.edu/papers/junior08.pdf>, [retrieved Apr. 12, 2016], undated (31 pages).

Coue et al., "Bayesian Occupancy Filtering for Multitarget Tracking: an Automotive Application", The International Journal of Robotics Research, Jan. 2006, pp. 19-30, retrieved from the Internet: <https://hal.inria.fr/inria-00182004/document>, [retrieved Apr. 12, 2016] (13 pages).

Baumann et al., "Occlusion-Free Path Planning with a Probabilistic Roadmap", IEEE, International Conference on Intelligent Robots and Systems, 2008, retrieved from the Internet: <http://www.cs.ubc.ca/~little/links/linked-papers/OcclusionFreePathPlanning_final.pdf>, [retrieved Apr. 12, 2016] (6 pages).

Wikipedia, "Ray tracing (graphics)", retrieved from the Internet: <https://en.wikipedia.org/wiki/Ray_tracing_(graphics)>, [retrieved Apr. 12, 2016] (10 pages).

Pfaff et al., "An Efficient Extension of Elevation Maps for Outdoor Terrain Mapping", Department of Computer Science, University of Freiburg, Germany, undated (12 pages).

Pepik et al., "Occlusion Patterns for Object Class Detection", CVPR, 2013, pp. 3286-3293 (8 pages).

Heckman et al., "Potential Negative Obstacle Detection by Occlusion Labeling", IEEE/RSJ International Conference on Intelligent Robots and Systems, Oct. 29-Nov. 2, 2007, pp. 2168-2173 (6 pages).

Xiang et al., "Object Detection by 3D Aspectlets and Occlusion Reasoning", ICCV, 2013, pp. 530-537 (8 pages).

Hsiao et al., "Coherent Occlusion Reasoning for Instance Recognition", The Robotics Institute, Carnegie Mellon University, Pittsburgh, PA, 2013 (5 pages).

Douillard et al., "A 3D Laser and Vision Based Classifier", Australian Centre for Field Robotics, Sydney, Australia, 2009 (6 pages).

Lindner et al., "Multi-view point cloud fusion for LiDAR based cooperative environment detection", Advances in Radio Science, 2015, pp. 209-215 (7 pages).

Er et al., "Perception of Dynamic Environments in Autonomous Robots", Proceedings of the 17th World Congress, The International Federation of Automatic Control, Seoul, Koreal, Jul. 6-11, 2008, pp. 8226-8231 (6 pages).

Biswas, "Hybrid Markov / Non-Markov Localization for Long-Term Autonomy of Mobile Robots in Varying Indoor Environments", The Robotics Institute, Carnegie Mellon University, Pittsburgh, PA, Thesis Proposal, undated (83 pages).

Teichman et al., "Towards 3D Object Recognition via Classification of Arbitrary Object Tracks", IEEE International Conference on Robotics and Automation, Shanghai International Conference Center, May 9-13, 2011, pp. 4034-4041 (8 pages).

Felzenswalb et al., "Efficient Graph-Based Image Segmentation", International Journal of Computer Vision, 2004, pp. 167-181 (15 pages).

Kuthirummal et al., "A Graph Traversal based Algorithm for Obstacle Detection using Lidar", IEEE/RSJ International Conference on Intelligent Robots and Systems, Sep. 25-30, 2011, San Francisco, CA, USA, pp. 3874-3880 (7 pages).

Nguyen, "Constructing Drivability Maps From 3D Laser Range Data for Autonomous Vehicles", pp. 1-17 (17 pages).

* cited by examiner

500

---

Transmitting a group of at least three outbound sensor signals into an external environment of the vehicle, the group of at least three outbound sensor signals including a first end signal, a second end signal, and an intermediate signal, the intermediate signal being located between the first end signal and the second end signal —510

↓

Receiving return sensor signals from at least a subset of the group of at least three outbound sensor signals —520

↓

If a return sensor signal is received for the first end signal and for the second end signal but a return signal is not received for the intermediate signal, determining whether an obstacle is located along a projected path of the intermediate signal —530

↓

Responsive to determining that an obstacle is located along the projected path of the intermediate signal, determining a driving maneuver for the vehicle relative to the obstacle —540

↓

Causing the vehicle to implement the determined driving maneuver —550

RAY TRACING FOR HIDDEN OBSTACLE DETECTION

FIELD

The subject matter described herein relates in general to vehicles and, more particularly, to sensor systems for vehicles.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. The presence of some objects may affect the determination of how to navigate and/or maneuver the vehicle through the surrounding environment.

SUMMARY

In one respect, the present disclosure is directed to a method of detecting hidden obstacles using ray tracing. The method can include transmitting an outbound sensor signal into an external environment of the vehicle. The method can also include, if a return sensor signal is not received for the outbound sensor signal, determining whether an obstacle is located along a projected path of the outbound sensor signal. Such determining can be performed using at least a map. Responsive to determining that an obstacle is located along the projected path of the outbound sensor signal, the method can include determining a driving maneuver for the vehicle relative to the obstacle. The method can further include causing the vehicle to implement the determined driving maneuver.

In another respect, the present disclosure is directed to a system of detecting hidden obstacles using ray tracing for a vehicle. The system includes a sensor system and a processor operatively connected to the sensor system. The sensor system can be configured to transmit an outbound sensor signal into an external environment of the vehicle and to receive return signals. The processor can be configured to determine whether an obstacle is located along a projected path of the outbound sensor signal if a return sensor signal is not received for the outbound sensor signal. Such a determination can be performed using at least a map. Responsive to determining that an obstacle is located along the projected path of the outbound sensor signal, the processor can be configured to determine a driving maneuver for the vehicle relative to the obstacle. The processor can be further configured to cause the vehicle to implement the determined driving maneuver.

In still another respect, the present disclosure is directed to a method of detecting hidden obstacles using ray tracing. The method can include transmitting a group of at least three outbound sensor signals into an external environment of the vehicle. The group of at least three outbound sensor signals can include a first end signal, a second end signal, and an intermediate signal. The intermediate signal can be located between the first end signal and the second end signal. The method can further include receiving return sensor signals from at least a subset of the group of at least three outbound sensor signals. The method can also include, if a return sensor signal is received for the first end signal and for the second end signal but a return signal is not received for the intermediate signal, determining whether an obstacle is located along a projected path of the intermediate signal. The method can include, responsive to determining that an obstacle is located in the projected path of the intermediate signal, determining a driving maneuver for the vehicle relative to the obstacle. The method can include causing the vehicle to implement the determined driving maneuver.

In yet another respect, the present disclosure is directed to a system of detecting hidden obstacles using ray tracing for a vehicle. The system can include a sensor system and a processor operatively connected to the sensor system. The sensor system can be configured to transmit a group of at least three outbound sensor signals into an external environment of the vehicle and to receive return signals. The group of at least three outbound sensor signals can include a first end signal, a second end signal, and an intermediate signal. The intermediate signal can be located between the first end signal and the second end signal. The processor can be configured to determine whether an obstacle is located along a projected path of the intermediate signal if a return sensor signal is received for the first end signal and for the second end signal but a return signal is not received for the intermediate signal. The processor can also be configured to, responsive to determining that an obstacle is located in the projected path of the intermediate signal, determine a driving maneuver for the vehicle relative to the obstacle. The processor can be configured to cause the vehicle to implement the determined driving maneuver.

BRIEF DESCRIPTION OF THE DRAWINGS

FIG. 5 is an example of a method of detecting hidden obstacles using ray tracing.

DETAILED DESCRIPTION

Figure 1:
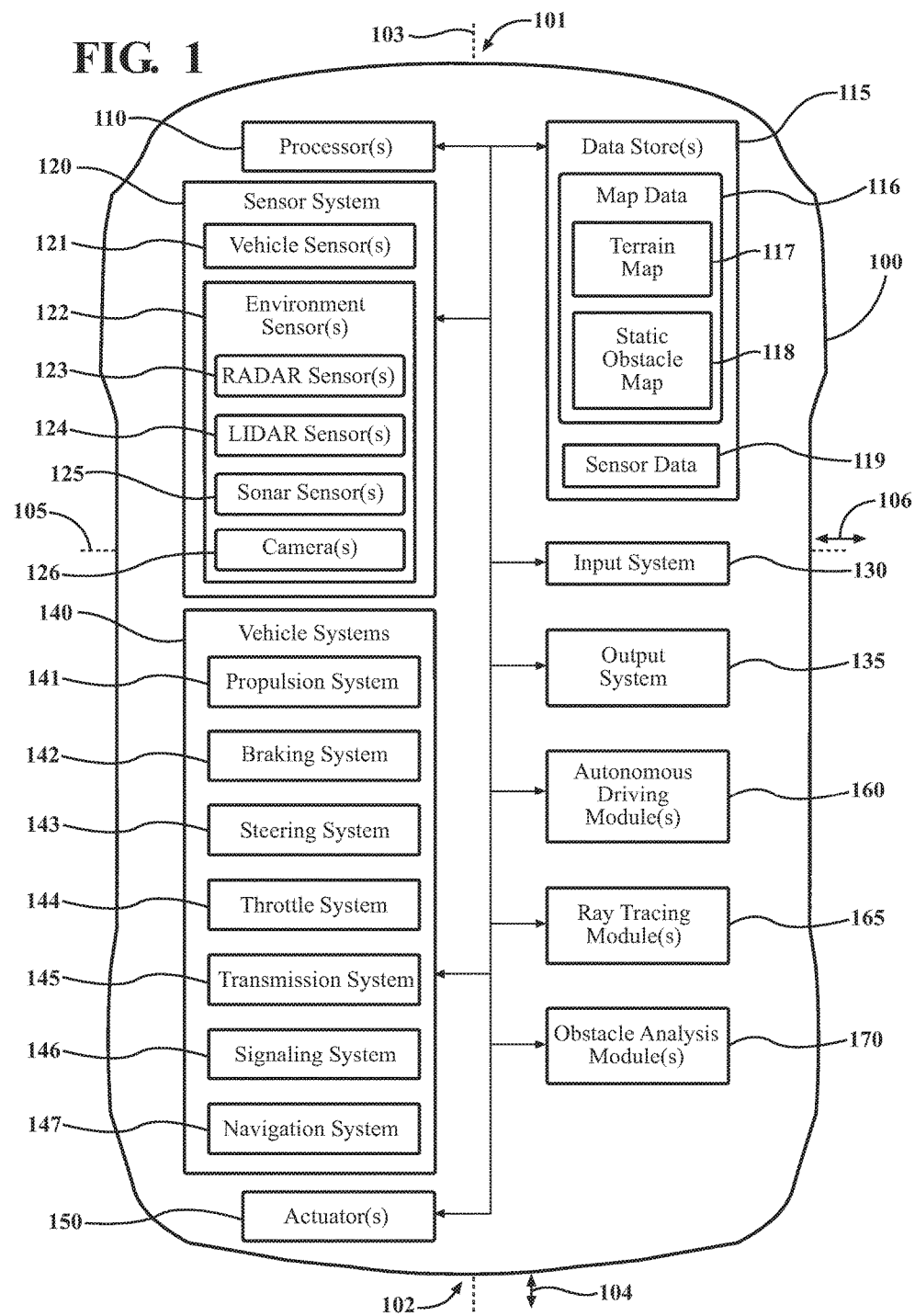
FIG. 1 is an example of a vehicle configured to detect hidden obstacles using ray tracing.

This detailed description relates to the detection of hidden obstacles located in an environment external of a vehicle. In instances in which an environment sensor does not receive a return signal, it could be an indication that the signal did not hit any obstacle within its working range, or it could be an indication that there is a hidden obstacle in the environment. Arrangements described herein can help to distinguish between such possibilities. According to arrangements herein, the external environment of the vehicle can be sensed by transmitting an outbound sensor signal can be into the external environment. If a return sensor signal is not received for the outbound sensor signal, it can be determined whether a hidden obstacle is located along a projected path of the outbound sensor signal by using one or more maps (e.g., a terrain map, a static obstacle map, and/or other type of map). Responsive to determining that a hidden obstacle is located along the projected path of the outbound sensor signal, a driving maneuver for the vehicle relative to the hidden obstacle can be determined. The vehicle can be caused to implement the determined driving maneuver. The present detailed description relates to systems and/or methods that incorporate one or more of such features. In at least some instances, such systems and/or methods can improve safety and/or performance of a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more arrangements, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated or completely automated. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. In some instances, the vehicle 100 can be configured to be selectively switched between an autonomous mode, one or more semi-autonomous operational modes, and/or a manual mode. Such switching can be implemented in any suitable manner, now known or later developed. "Manual mode" means that all of or a majority of the navigation and/or maneuvering of the vehicle is performed by a human driver. In one or more arrangements, the vehicle 100 can be a conventional vehicle that is configured to operate in only a manual mode.

The vehicle 100 can have a forward end 101 and a rearward end 102. The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. The terrain map(s) 117 can be high quality and/or highly detailed.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated continuously, periodically, irregularly, or even randomly to reflect additions, removals, and/or changes within a mapped area.

The one or more data stores 115 can include sensor data 119. In this context, "sensor data" means any information about the sensors that the vehicle 100 is equipped with, including the capabilities, parameters, characteristics, ranges, and other information about such sensors. As will be explained below, the vehicle 100 can include a sensor system 120. The sensor data 119 can relate to one or more sensors of the sensor system 120. As an example, in one or more arrangements, the sensor data 119 can include information on one or more LIDAR sensors 124 of the sensor system 120. Such information can include, for example, the number of outbound sensor signals emitted by the LIDAR or other sensor(s), the maximum working range of one or more of such outbound sensor signals, the arrangement of the outbound sensor signals, the orientation of the outbound sensor signals, and/or the frequency at which the outbound sensor signals are emitted. Such data can be obtained from any suitable source, including a sensor manufacturer, the vehicle manufacturer, and/or based on test data, just to name a few possibilities.

In some instances, at least a portion of the map data 116 and/or the sensor data 119 can be located in one or more data stores 115 located onboard the vehicle 100. Alternatively or in addition, at least a portion of the map data 116 and/or the sensor data 119 can be located in one or more data stores 115 that are located remote from the vehicle 100. The map data 116 and/or the sensor data 119 can be obtained by the vehicle 100 from any suitable source, including a sensor manufacturer, the vehicle manufacturer, and/or based on test data, just to name a few possibilities.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the vehicle 100 itself. In one or more arrangements, the vehicle sensor(s) 121 can be configured to detect, determine, assess, monitor, measure, quantify and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the vehicle 100. In one or more arrangements, the vehicle sensor(s) 121 can include a speedometer (not shown). The speedometer can determine a current speed of the vehicle 100, or data acquired by the speedometer can be used to determine a current speed of the vehicle 100.

Alternatively or in addition, the sensor system 120 can include one or more environment sensors 122 configured to acquire, detect, determine, assess, monitor, measure, quantify and/or sense driving environment data. "Driving environment data" includes and data or information about the external environment in which an autonomous vehicle is located or one or more portions thereof. For example, the one or more environment sensors 122 can be configured to detect, determine, assess, monitor, measure, quantify and/or sense obstacles in at least a portion of the external environment of the vehicle 100 and/or information/data about such obstacles. Such obstacles may be stationary objects and/or dynamic objects. The one or more environment sensors 122 can be configured to detect, determine, assess, monitor, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 122 can include a global navigation satellite system (GNSS), a global positioning system (GPS), a navigation system (which can be the navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123. "Radar sensor" means any device, component and/or system that can detect, determine, assess, monitor, measure, quantify and/or sense something using at least in part radio signals. The one or more radar sensors 123 can be configured to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle and/or the movement of each detected obstacle. The one or more radar sensors 123, or data obtained thereby, can determine the speed of obstacles in the external environment of the vehicle 100. Three dimensional coordinate information can be associated with the data acquired by the one or more radar sensors 123.

In one or more arrangements, the sensor system 120 can include one or more LIDAR sensors 124. "LIDAR sensor" means any device, component and/or system that can detect, determine, assess, monitor, measure, quantify and/or sense obstacles using at least in part lasers. The LIDAR sensor can include a laser source and/or laser scanner configured to emit a laser signal and a detector configured to detect reflections of the laser signal. The one or more LIDAR sensors 124 can be configured to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

In one or more arrangements, the sensor system 120 can include one or more sonar sensors 125. "Sonar sensor" means any device, component and/or system that can detect, determine, assess, monitor, measure, quantify and/or sense something using at least in part sound waves. The one or more sonar sensors 125 can be configured to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

The sensor system 120 can include can include one or more cameras 126. "Camera" includes any device(s), component(s), and/or system(s) that is configured to capture visual data. "Visual data" includes video and/or image information/data. The visual data can be in any suitable form. In one or more arrangements, one or more of the cameras 126 can be oriented, positioned, configured, operable, and/or arranged to capture visual data from at least a portion of the external environment of the vehicle 100. Visual data acquired by the one or more cameras 126 can be used to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions, the elevation of each detected obstacle, the speed of each detected obstacle, and/or the movement of each detected obstacle.

The one or more cameras 126 can be high resolution cameras. The high resolution can refer to the pixel resolution, the spatial resolution, spectral resolution, temporal resolution and/or radiometric resolution. In one or more arrangements, the one or more cameras 126 can be high dynamic range (HDR) cameras or infrared (IR) cameras. The one or more cameras 126 can capture visual data in any suitable wavelength on the electromagnetic spectrum.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

The sensor system 120 can include one or more ranging sensors. "Ranging sensors" include sensors that can detect, determine, assess, monitor, measure, quantify and/or sense obstacles from a distance and do not require physical contact with the obstacle. The various environment sensors 122 described above are examples of ranging sensors. Alternatively or in addition to one or more of the above examples, one or more sensors can be configured to detect, determine, assess, monitor, measure, quantify and/or sense the location of the vehicle 100 and/or the location of obstacles in the environment relative to the vehicle 100. Any suitable sensor can be used for such purposes. Such sensors may work independently and/or in combination with a positioning system of the vehicle 100.

Figure 2:
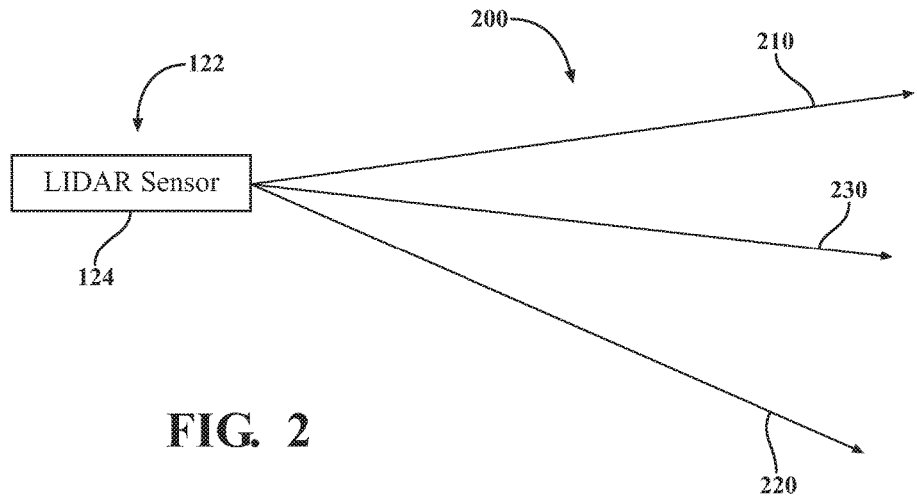
FIG. 2 is an example of a plurality of outbound sensor signals transmitted by a driving environment sensor.

It should be noted that the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed. A general description of the operation of a LIDAR sensor 124 is shown in FIG. 2. However, it will be understood that the description is applicable to other environment sensors 122.

The LIDAR sensor 124 can emit at least one outbound sensor signal 200 into the external environment. In some instances, the LIDAR sensor 124 can emit a plurality of outbound sensor signals 200. More particularly, the plurality of outbound sensor signals 200 can include at least three outbound signals: a first end signal 210, a second end signal 220, and one or more intermediate signals 230. The intermediate signals 230 can be located between the first end signal 210 and the second end signal 220. The outbound sensor signals 200 can be emitted from a common signal source. The outbound sensor signals 200 can be arranged and/or distributed in any suitable manner. In one or more arrangements, the outbound sensor signals 200 can be equally spaced apart. While FIG. 2 shows a two-dimensional array of outbound sensor signals 200, it will be appreciated that the outbound sensor signals 200 can include one or more outbound sensor signals that are emitted into and out of the plane of the page in FIG. 2. In one or more arrangements, the outbound sensor signals 200 can be emitted in a substantially semi-spherical array. Information about the outbound sensor signals 200 can be included in the sensor data 119.

Returning to FIG. 1, the vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display. Alternatively or in addition, the output system 135 may include a microphone, earphone and/or speaker. Some components of the vehicle 100 may serve as both a component of the input system 130 and a component of the output system 135.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

The vehicle 100 can include one or more ray tracing modules 165. The ray tracing module(s) 165 can be used when a return signal is not received for one or more of the outbound sensor signals emitted by the sensor system 120. The lack of a return sensor signal can be indicative of at least possibilities. In one instance, the lack of a return signal can indicate a hidden obstacle located in the path of the outbound sensor signal. Examples of hidden obstacles include highly reflective obstacles (e.g., mirror like objects), black obstacles (e.g., objects that absorb sensor signals), and/or an obstacle that otherwise prevents a return signal from being reflected back to the sensor system. A hidden obstacle is one that is effectively invisible to a particular environment sensor (e.g., a LIDAR sensor 124) such that it cannot be detected by that particular environment sensor alone. Alternatively, the lack of a return signal can be indicative of the fact that the outbound sensor signal did not hit any obstacle within its maximum working range. In such case, no obstacle exists on the travel path of the outbound sensor signal (e.g., on the travel path of a LIDAR sensor ray).

In one or more arrangements, the ray tracing module(s) 165 can be used when a return signal is not received for one or more outboard sensor signals emitted by one or more environment sensors 122. More particularly, the ray tracing module(s) 165 can be used when a return LIDAR signal is not received for one or more outbound LIDAR signals emitted by one or more of the LIDAR sensors 124. The ray tracing module(s) 165 can be configured to receive data from the sensor system 120 (e.g., data acquired by one or more sensors of the vehicle sensors 121 and/or one or more of the environment sensors 122) and/or the data store(s) 115 (e.g., map data 116 and/or sensor data 119). The ray tracing module(s) 165 can be configured to compare information about an outbound sensor signal for which a return sensor signal was not received to one or more maps (e.g., the terrain map 117 and/or the static obstacle map 118).

In one or more arrangements, the ray tracing module(s) 165 can be configured to generate a projected path of an outbound sensor signal for which a return sensor signal was not received. The projected path can be made using the sensor data 119 and/or data acquired by the sensor system 120. With such information, the projected path can be oriented, arranged, and/or configured to accurately represent the actual outbound sensor signal for which a return sensor signal was not received. The projected path can extend from an origin (e.g., the sensor signal transmitter) to a distance corresponding to the maximum working range of the particular sensor. The projected path can be substantially linear. The projected path can be oriented in accordance with the orientation of the actual corresponding outbound sensor signal. Thus, the projected path can accurately represent the actual path of the outbound sensor signal.

The ray tracing module(s) 165 can be configured to analyze the projected path relative to map data 116 (e.g., a terrain map 117 and/or a static obstacle map 118). For example, the projected path can be analyzed relative to map data 116 to determine whether the outbound sensor signal, within its maximum working range, should have hit an obstacle in the external environment (e.g., the ground or a static obstacle) which would have resulted in receiving a return sensor signal. For instance, if the projected travel path of the outbound sensor signal intersects with a ground surface defined by the terrain map 117 and/or any portion of a static obstacle defined by the static obstacle map 118, then a return sensor signal would be expected.

If ray tracing module(s) 165 determine that the outbound sensor signal should have hit a static obstacle and/or the ground in the external environment, the ray tracing module(s) 165 can be configured to determine or otherwise assume that there is a hidden obstacle located in the external environment along the path of the outbound sensor signal. In such case, the ray tracing module(s) 165 can be configured to provide an indication, such as to the autonomous driving module(s) 160, to implement a conservative driving maneuver. "Conservative driving maneuver" means a driving maneuver that attempts to carefully approach a hidden obstacle so as to avoid or reduce the likelihood of a collision with the hidden obstacle and/or to avoid or reduce the likelihood of a sudden or drastic driving maneuver. Examples of conservative driving maneuvers can include changing travel lanes to be farther away from the hidden obstacle in the lateral direction 106, moving in the lateral direction 106 within a current travel lane of the vehicle 100, and/or a reducing a current speed of the vehicle, just to name a few possibilities. Conservative driving maneuvers can avoid drastic changes in the operation of the vehicle 100. Further, conservative driving maneuvers generally avoid violating traffic rules. The one or more data stores 115 can include a traffic rules information.

If ray tracing module(s) 165 determine that the outbound sensor signal would not have hit a static obstacle based on the static obstacle map 118 and/or the ground based on the terrain map 117, the ray tracing module(s) 165 can be configured to determine that there is no hidden obstacle in the external environment along the path of the outbound sensor signal. In such case, the ray tracing module(s) 165 can be configured to provide an indication to the autonomous driving module(s) 160 to maintain a current driving maneuver or to not alter the current driving maneuver at least based on the lack of a return sensor signal.

In one or more arrangements, the ray tracing module(s) 165 can be configured to infer the position and/or size of the hidden obstacles. The vehicle 100 can take into account the position and/or size of such hidden obstacles with respect to determining driving maneuvers.

The ray tracing module(s) 165 can be configured to determine the position and/or size of the hidden obstacles in any suitable manner. For example, the ray tracing module(s) can infer the position and/or size of the hidden obstacles using the static obstacle map 118 and/or the terrain map 117. For instance, using the plurality of outbound sensor signals 200 in FIG. 2 as an example, the size and/or position of a hidden obstacle can be inferred from the return LIDAR signals received by the LIDAR sensor 124. For this example, the first end signal 210 can hit an obstacle at distance X from the LIDAR sensor 124, and the second end signal 220 can hit an obstacle at a distance Y from the LIDAR sensor 124. If a return LIDAR signal is not received for the intermediate signal 230, then it can initially be inferred that a length of the hidden obstacle is X-Y in the direction of the intermediate signal 230. Of course, similar inferences can be made based on the distance between LIDAR return signals in the direction into and/or out of the page in FIG. 2. Likewise, the information obtained by the return LIDAR signals for the first end signal 210 and the second end signal 220 can be used to determine a general position of the hidden obstacle, as the return signals can include position data.

The vehicle 100 can include one or more obstacle analysis modules 170. The obstacle analysis module(s) 170 can be used to further refine the size and/or position of a hidden obstacle. The obstacle analysis module(s) 170 can perform such refining by using data acquired by other environment sensors 122 of the sensor system 120. For example, visual data acquired by the camera(s) 126 can be used to more accurately determine the size and/or position of a hidden obstacle. For instance, the obstacle analysis module(s) 170 can be configured to analyze visual data using any suitable technique, including, for example, template matching and/or other kinds of computer vision and/or image processing techniques and/or other artificial or computational intelligence algorithms or machine learning methods. The obstacle analysis module(s) 170 can be configured to detect obstacles within visual data.

The obstacle analysis module(s) 170 can be configured to identify obstacles (e.g., vehicles) within visual data. For instance, the obstacle analysis module(s) 170 can include and/or have access to an object image database (not shown). The objects image database can include one or more images of a plurality of different objects (e.g., vehicles) or portions thereof. Arrangements will be described herein in connection with vehicle, but it will be understood that arrangements are not limited to vehicles. Indeed, the object image database can include one or more images of non-vehicular objects. The images may be of one or more portions of the exterior of at least a portion of a plurality of different vehicles. For instance, the images can be of at least a portion of a vehicle. The images can be provided in any suitable format. The vehicle image database can be located on-board the vehicle 100, such as in the data store(s) 115, or it can be located in a source external to the vehicle 100 (e.g., in a cloud-based data store).

As an example, the obstacle analysis module(s) 170 can also include any suitable vehicle recognition software or other object recognition software. The vehicle recognition software can analyze visual data captured by the camera(s) 126. The vehicle recognition software can query the vehicle image database for possible matches. For instance, visual data captured by the camera(s) 126 can be compared to images in the vehicle image database for possible matches. Alternatively or in addition, measurements or other aspects of visual data captured by the camera(s) 126 can be compared to measurements or other aspects of any images in the vehicle image database. The obstacle analysis module(s) 170 can identify the detected object as a particular type of vehicle if there is a match between the captured image and an image in the vehicle database.

In this context, "match" or "matches" means that an image or other information collected by the sensor system and one or more of the images in the vehicle database are substantially identical. For instance, the an image or other information collected by the sensor system and one or more of the images in the vehicle database can match within a predetermined probability (e.g., at least about 85%, at least about 90%, at least about 95% or greater) or confidence level.

The autonomous driving module(s) 160, the obstacle analysis module(s) 170, and/or the processor(s) 110 can be configured to analyze data/information, including visual data, captured by the sensor system 120 to identify one or more objects in the external environment of the vehicle 100. In some arrangements, one or more of these elements can be configured to identify the nature of the objects (e.g., whether the object is a vehicle) using any suitable technique, including, for example, template matching and other kinds of computer vision and/or image processing techniques and/or other artificial or computational intelligence algorithms or machine learning methods.

When a hidden obstacle is detected by the ray tracing module(s) 165, as described above, the results can be cross-checked with the visual data acquired by the camera(s) 126. For example, the obstacle analysis module(s) 170 can analyze visual data acquired by the camera(s). One or more possible obstacle candidates can be detected within the image data. The obstacle candidates can be projected back into space to refine the position and size estimated by the sensor system 120 (e.g., the environment sensors 122, the LIDAR sensors 124, etc.).

The vehicle 100 can include one or more obstacle analysis module(s) 170. In some arrangements, the sensor system 120, the processor(s) 110, and/or the obstacle analysis module(s) 170 can be configured to detect, determine, assess, measure, quantify and/or sense, directly or indirectly, one or more dimensions of a detected obstacle. For instance, based on information/data received from one or more sensors of the sensor system 120, a direct measurement of one or more dimensions of a detected obstacle can be determined. Examples of dimensions that can be detected, determined, assessed, measured, quantified and/or sensed, directly or indirectly, include length, width and/or height. In one or more arrangements, such dimensions and/or measurements can be detected, determined, assessed, measured, quantified and/or sensed using visual data acquired by the camera(s) 126. In one or more arrangements, such dimensions and/or measurements can be made relative to static obstacles included in the static obstacle map(s) 118, including information associated with the static obstacles.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed The navigation system 147 can include one or more mechanisms, devices, elements, components, systems, applications and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

Figure 3:
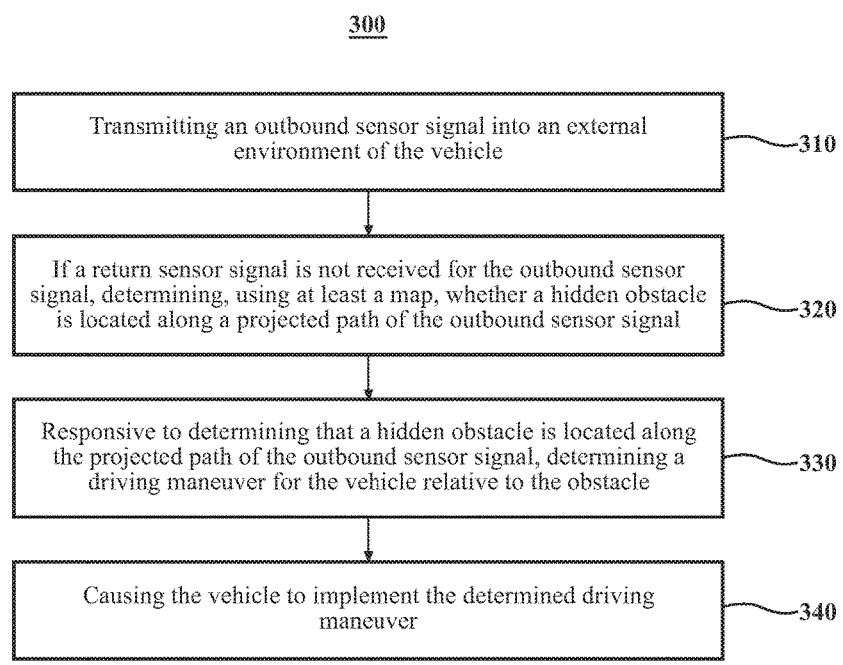
FIG. 3 is an example of a method of detecting hidden obstacles using ray tracing.

Now that the various potential systems, devices, elements and/or components of the vehicle 100 have been described, various methods of detecting hidden obstacles using ray tracing will now be described. Referring now to FIG. 3, an example of a method of using ray tracing to detect hidden obstacles in an external environment of a vehicle is shown. Various possible steps of such methods will now be described. The method 300 illustrated in FIG. 3 may be applicable to the arrangements described above in relation to FIGS. 1-2, but it is understood that the method 300 can be carried out with other suitable systems and arrangements. Moreover, the methods 300 may include other steps that are not shown here, and in fact, the methods 300 are not limited to including every step shown. The blocks that are illustrated here as part of the method 300 are not limited to the particular chronological order. Indeed, some of the blocks may be performed in a different order than what is shown and/or at least some of the blocks shown can occur simultaneously.

At block 310, an outbound sensor signal 200 can be transmitted into an external environment of the vehicle 100. For instance, the outbound sensor signal 200 can be transmitted by one or more environment sensors 122 of the sensor system 120. As an example, the outbound sensor signal 200 can be transmitted by a LIDAR sensor 124, such as by a transmitter or a transceiver of the LIDAR sensor 124. The method 300 can continue to block 320.

At block 320, if a return sensor signal is not received for the outbound sensor signal 200, it can be determined whether a hidden obstacle is located along a projected path of the outbound sensor signal 200. Such a determination can be performed by the ray tracing module(s) 165 and/or the processor(s) 110. The determination can be made with respect to map data 116, such as the terrain map 117 and/or the static obstacle map 118. In one or more arrangements, the determination can be made with respect to the terrain map 117 and the static obstacle map 118. A projected path of the outbound sensor signal 200 can be generated using sensor data 119 and/or other data acquired by the sensor system 120. The projected path of the outbound sensor signal 200 can be compared to the map data 116 to determine whether there is a hidden obstacle. The method 300 can continue to block 330.

At block 330, responsive to determining that a hidden obstacle is located along the projected path of the outbound sensor signal 200, a driving maneuver for the vehicle 100 can be determined relative to the hidden obstacle. For instance, the driving maneuver may be continuing the current driving maneuver in a conservative manner. For example, the driving maneuver may be a reduction in speed. The driving maneuver can be determined by the processor(s) 110, the ray tracing module(s) 165, and/or the autonomous driving module(s) 160. The method 300 can continue to block 340.

At block 340, the vehicle 100 can be caused to implement the determined driving maneuver. The vehicle 100 can be caused to implement the determined driving maneuver in any suitable manner. In one or more arrangements, the processor(s) 110, the ray tracing module(s) 165, and/or the autonomous driving module(s) 160 can cause the vehicle 100 to implement the driving maneuver. The processor(s) 110, the ray tracing module(s) 165, and/or the autonomous driving module(s) 160 can be operatively connected to one or more of the vehicle systems 140 to implement the determined driving maneuver. In one or more arrangements, the processor(s) 110, the ray tracing module(s) 165, and/or the autonomous driving module(s) 160 can be operable to control the one or more actuators 150, which can control one or more of the vehicle systems 140 or portions thereof to implement the determined driving maneuver.

When the vehicle 100 is caused to implement the driving maneuver, the method 300 can end. Alternatively, the method 300 can return to block 310 or some other block. As a further alternative, the method 300 can include additional and/or alternative blocks (not shown). For example, the method 300 can further include determining at least one of the size or the position of the hidden obstacle. In such case, the determination of the driving maneuver for the vehicle 100 relative to the hidden obstacle can be based at least partially on the size and/or the position of the hidden obstacle.

Figure 4:
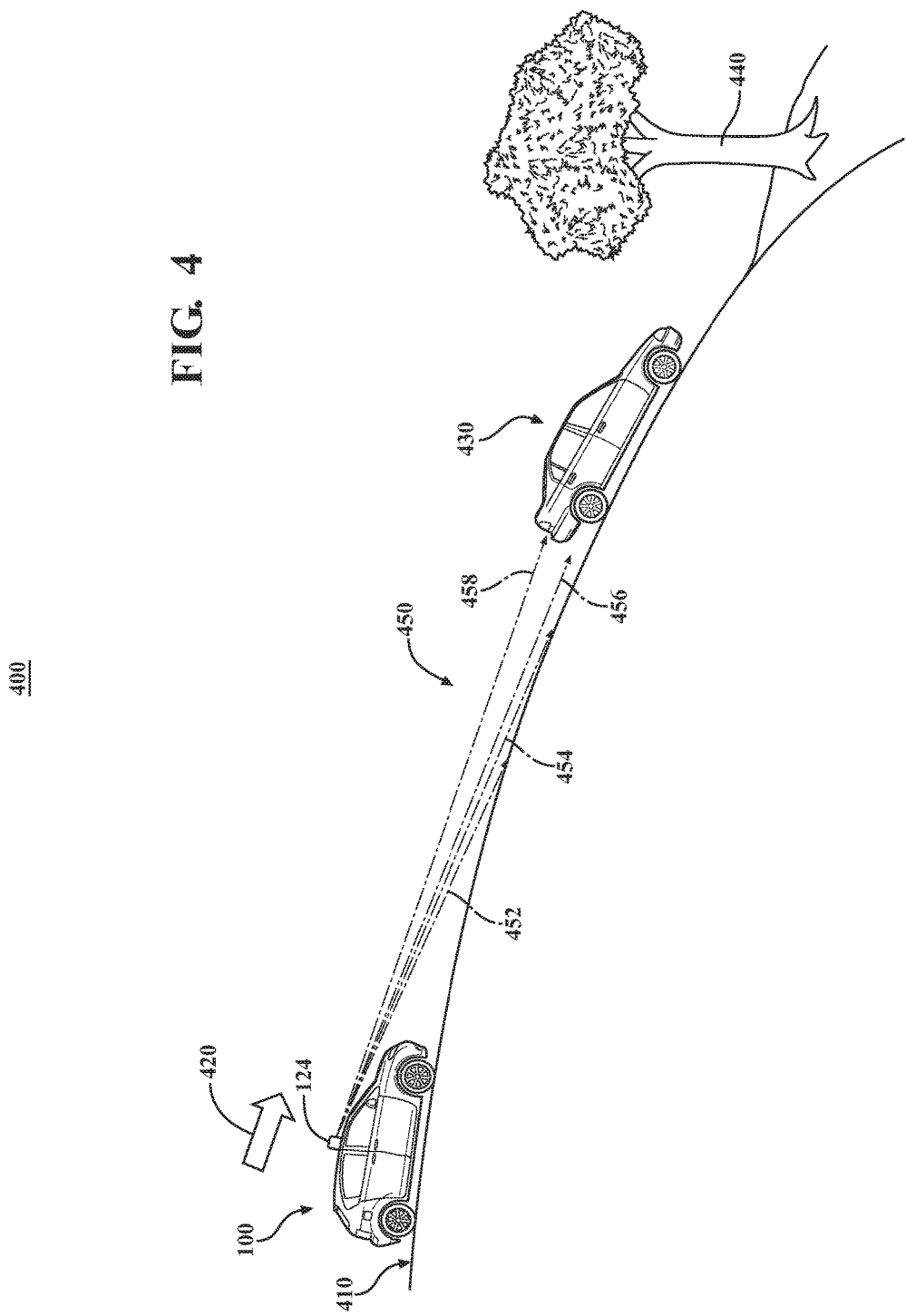
FIG. 4 is a view of a driving scenario that includes a hidden obstacle.

A non-limiting example of the operation of the vehicle 100 and/or the method 300 will now be described in relation to FIG. 4. The vehicle 100 can be traveling in an environment 400, which is the external environment of the vehicle 100. The vehicle 100 can be traveling on a road 410. The road 410 in this example can be curved and sloped downwardly in a travel direction 420 of the vehicle 100.

Another vehicle 430 can also be traveling on the road 410. The other vehicle 430 can be traveling in substantially the same travel direction 420 as the vehicle 100. The other vehicle 430 can be located forward of the vehicle 100 in the travel direction. The other vehicle 430 can be a black obstacle that will absorb or substantially absorb LIDAR signals that impinge upon it.

A tree 440 can be located in the environment 400. The tree 440 can be located forward of the vehicle 100 in the travel direction 420. The other vehicle 430 can be located between the tree 440 and the vehicle 100. The vehicle 100 can include the static obstacle map 118 and/or a terrain map 117 for the environment 400. The static obstacle map 118 can include the tree 440.

The vehicle 100 can sense the environment 400 using, for example, one or more LIDAR sensors 124. The LIDAR sensor 124 can emit a plurality of outbound LIDAR signals 450. For simplicity, there will be a first outbound LIDAR signal 452, a second outbound LIDAR signal 454, a third outbound LIDAR signal 456, and a fourth outbound LIDAR signal 458. The first outbound LIDAR signal 452, the second outbound LIDAR signal 454, and the third outbound LIDAR signal 456 will hit the road 410 or the ground, and a return LIDAR signal will be received for first outbound LIDAR signal 452, the second outbound LIDAR signal 454, and the third outbound LIDAR signal 456.

The fourth outbound LIDAR signal 458 will hit the other vehicle 430. However, since the other vehicle 430 is a black obstacle, the fourth outbound LIDAR signal 458 can be absorbed by the other vehicle 430, which is a black obstacle.

Consequently, there will not be a return LIDAR signal corresponding to the fourth outbound LIDAR signal 458.

The vehicle 100 can use ray tracing to determine whether a hidden obstacle is located along the projected path of the fourth outbound LIDAR signal 458. The projected path of the fourth outbound LIDAR signal 458 can be analyzed relative to the terrain map(s) 117 and/or the static obstacle map(s) 118. A projected path of the fourth outbound LIDAR signal 458 can be generated using sensor data 119 and/or other data acquired by the sensor system 120. Such a determination can be performed by the ray tracing module(s) 165 and/or the processor(s) 110.

In some instances, the projected path of the fourth outbound LIDAR signal 458 can be analyzed relative to the terrain map 117. However, using the terrain map 117 alone, the ray tracing module(s) 165 and/or the processor(s) 110 would not be able to determine whether the fourth outbound LIDAR signal 458 reached its maximum sensing range without a return or whether it hit a hidden obstacle.

Alternatively or in addition, the projected path of the fourth outbound LIDAR signal 458 can be analyzed relative to the static obstacle map 118, which, as noted above, includes the tree 440. In this example, when the projected path of the fourth outbound LIDAR signal 458 is analyzed relative to the static obstacle map 118, it can be determined that the fourth outbound LIDAR signal 458 would have hit the tree 440 because the tree was well within the detection range of the LIDAR sensor 124 and the projected travel path of the fourth outbound LIDAR signal 458 would intersect with the tree 440. As such, a return LIDAR signal should have been received. As a result, it can be determined that there is a hidden obstacle located between the vehicle 100 and the tree 440.

Accordingly, a driving maneuver for the vehicle 100 can be determined relative to the hidden obstacle. For instance, the driving maneuver may be continuing the current driving maneuver in a more conservative manner. For example, the driving maneuver may be a reduction in speed. The driving maneuver can be determined by the processor(s) 110, the ray tracing module(s) 165, and/or the autonomous driving module(s) 160. In this example, the driving maneuver can be a reduction in the speed of the vehicle 100.

The vehicle 100 can be caused to implement the determined driving maneuver. For instance, the processor(s) 110, the ray tracing module(s) 165, and/or the autonomous driving module(s) 160 can cause the vehicle 100 to implement the driving maneuver. The processor(s) 110, the ray tracing module(s) 165, and/or the autonomous driving module(s) 160 can be operatively connected to one or more of the vehicle systems 140 to implement the determined driving maneuver. In one or more arrangements, the processor(s) 110, the ray tracing module(s) 165, and/or the autonomous driving module(s) 160 can be operable to control the one or more actuators 150, which can control one or more of the vehicle systems 140 or portions thereof to implement the determined driving maneuver.

Referring now to FIG. 5, another example of a method of using ray tracing to detect hidden obstacles in an external environment of a vehicle is shown. Various possible steps of such methods will now be described. The method 500 illustrated in FIG. 5 may be applicable to the arrangements described above in relation to FIGS. 1-2, but it is understood that the method 500 can be carried out with other suitable systems and arrangements. Moreover, the methods 500 may include other steps that are not shown here, and in fact, the method 500 is not limited to including every step shown. The blocks that are illustrated here as part of the method 500 are not limited to the particular chronological order. Indeed, some of the blocks may be performed in a different order than what is shown and/or at least some of the blocks shown can occur simultaneously.

At block 510, a group of at least three outbound sensor signals can be transmitted into an external environment of the vehicle 100. The group of at least three outbound sensor signals 200 can include a first end signal 210, a second end signal 220, and an intermediate signal 230. The intermediate signal 230 can be located between the first end signal 210 and the second end signal 220. The group of at least three outbound sensor signals 200 can be transmitted by one or more environment sensors 122 of the sensor system 120, such as by a LIDAR sensor 124. The method 500 can continue to block 520.

At block 520, return sensor signals from at least a subset of the group of at least three outbound sensor signals can be received. For instance, the return sensor signal can be received by the one or more environment sensors 122 that transmitted the outbound sensor signals 200. As an example, the return sensor signals can be received by a LIDAR sensor 124, such as by a receiver or a transceiver of the LIDAR sensor 124. The method 500 can continue to block 530.

At block 530, if a return sensor signal is received for the first end signal 210 and for the second end signal 220 but a return signal is not received for the intermediate signal 230, it can be determined whether a hidden obstacle is located along a projected path of the intermediate signal 230. Such a determination can be performed by the ray tracing module(s) 165 and/or the processor(s) 110. The determination can be made with respect to map data 116, such as the terrain map 117 and/or the static obstacle map 118. For example, a projected path of the intermediate signal 230 can be generated using sensor data 119 and/or other data acquired by the sensor system 120. The method 300 can continue to block 540.

At block 540, responsive to determining that a hidden obstacle is located along the projected path of the intermediate signal 230, a driving maneuver for the vehicle 100 can be determined relative to the hidden obstacle. For instance, the driving maneuver may be continuing the current driving maneuver in a more conservative manner. For example, the driving maneuver may be a reduction in speed. The driving maneuver can be determined by the processor(s) 110, the ray tracing module(s) 165, and/or the autonomous driving module(s) 160. The method 500 can continue to block 550.

At block 550, the vehicle 100 can be caused to implement the determined driving maneuver. The vehicle 100 can be caused to implement the determined driving maneuver in any suitable manner. In one or more arrangements, the processor(s) 110, the ray tracing module(s) 165, and/or the autonomous driving module(s) 160 can cause the vehicle 100 to implement the driving maneuver. The processor(s) 110, the ray tracing module(s) 165, and/or the autonomous driving module(s) 160 can be operatively connected to one or more of the vehicle systems 140 to implement the determined driving maneuver. In one or more arrangements, the processor(s) 110, the ray tracing module(s) 165, and/or the autonomous driving module(s) 160 can be operable to control the one or more actuators 150, which can control one or more of the vehicle systems 140 or portions thereof to implement the determined driving maneuver.

When the vehicle 100 is caused to implement the driving maneuver, the method 500 can end. Alternatively, the method 500 can return to block 510 or some other block. As a further alternative, the method 500 can include additional and/or alternative blocks (not shown).

Figure 6:
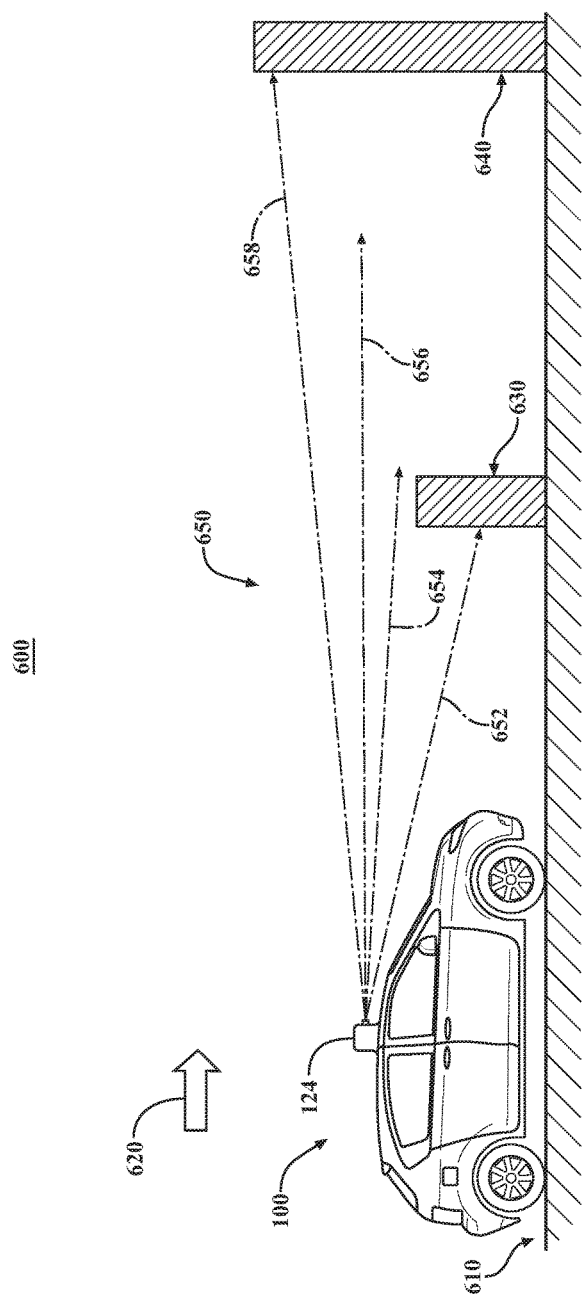
FIG. 6 is a view of a driving scenario that includes a hidden obstacle.

A non-limiting example of the operation of the vehicle 100 and/or the method 500 will now be described in relation to FIG. 6. The vehicle 100 can be traveling in an environment 600, which is the external environment of the vehicle 100. The vehicle 100 can be traveling on a road 610 in a travel direction 620. For purposes of this example, the road 610 can be substantially horizontal. The vehicle 100 can include the static obstacle map(s) 118 and/or the terrain map(s) 117 for the environment 600.

A first static obstacle 630 and a second static obstacle 640 can be located in the environment 600. The static obstacle map 118 can include the first static obstacle 630 and the second static obstacle 640. The first static obstacle 630 and the second static obstacle 640 can be located forward of the vehicle 100 in the travel direction 620. The first static obstacle 630 can be located between the vehicle 100 and the second static obstacle 640. While not shown, there can be a hidden obstacle located between the first static obstacle 630 and the second static obstacle 640.

The vehicle 100 can sense the environment 600 using, for example, one or more LIDAR sensors 124. The LIDAR sensor 124 can emit a plurality of outbound LIDAR signals 650. For simplicity, there will be a first outbound LIDAR signal 652, a second outbound LIDAR signal 654, a third outbound LIDAR signal 656, and a fourth outbound LIDAR signal 658. The first outbound LIDAR signal 652 will hit the first static obstacle 630, and the fourth outbound LIDAR signal will hit the second static obstacle 640. The second outbound LIDAR signal 654, and the third outbound LIDAR signal 656 will hit the hidden obstacle located between the first static obstacle 630 and the second static obstacle 640. The hidden obstacle can absorb the second outbound LIDAR signal 654 and the third outbound LIDAR signal 656. Consequently, return signals corresponding to the second outbound LIDAR signal 654, and the third outbound LIDAR signal 656 will not be received.

In some arrangements, the ray tracing module(s) 165 and/or the processor(s) 110 can automatically determine, based on the pattern of the return signals, that there is a hidden obstacle in the space between the first static obstacle 630 and the second static obstacle 640. Alternatively or in addition, the vehicle 100 can use ray tracing to determine whether a hidden obstacle is located along the projected path of the second outbound LIDAR signal 654 and the third outbound LIDAR signal 656. The projected path of the second outbound LIDAR signal 654 and the third outbound LIDAR signal 656 can be analyzed relative to the terrain map 117 and/or the static obstacle map 118. Such analysis would reveal a hidden obstacle between the first static obstacle 630 and the second static obstacle 640 because, if there was not a hidden obstacle in such location, then the second outbound LIDAR signal 654 and the third outbound LIDAR signal 656 would have hit the road 610, the first static obstacle 630, or the second static obstacle 640. Further, the ray tracing module(s) 165 and/or the processor(s) 110 can infer the position and/or the size of the hidden obstacle using the information about the size and/or location of the first static obstacle 630 and the second static obstacle 640, along with the projected path of the second outbound LIDAR signal 654 and the third outbound LIDAR signal 656.

Accordingly, a driving maneuver for the vehicle 100 can be determined relative to the hidden obstacle. For instance, the driving maneuver may be continuing the current driving maneuver in a more conservative manner. The driving maneuver can be determined by the processor(s) 110, the ray tracing module(s) 165, and/or the autonomous driving module(s) 160. The vehicle 100 can be caused to implement the determined driving maneuver. For instance, the processor(s) 110, the ray tracing module(s) 165, and/or the autonomous driving module(s) 160 can cause the vehicle 100 to implement the driving maneuver. The processor(s) 110, the ray tracing module(s) 165, and/or the autonomous driving module(s) 160 can be operatively connected to one or more of the vehicle systems 140 to implement the determined driving maneuver. In one or more arrangements, the processor(s) 110, the ray tracing module(s) 165, and/or the autonomous driving module(s) 160 can be operable to control the one or more actuators 150, which can control one or more of the vehicle systems 140 or portions thereof to implement the determined driving maneuver.

It will be appreciated that arrangements described herein can provide numerous benefits, including one or more of the benefits mentioned herein. For example, arrangements described herein can improve the performance and/or safety of an autonomous vehicle. Arrangements described here can facilitate the smooth operation of an autonomous vehicle in environments with hidden obstacles. Arrangements described herein can avoid or minimize sudden, unnecessary, and/or drastic vehicle actions (e.g., lane shifts, lane changes or vehicle stops) due to the presence of one or more hidden obstacles. Arrangements described herein can provide an efficient manner of detecting hidden obstacles. Arrangements described herein can determine appropriate driving maneuvers for a vehicle relative to any detected hidden obstacles.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of detecting hidden obstacles using ray tracing for a vehicle, the method comprising:

transmitting an outbound sensor signal into an external environment of the vehicle, whereby, when the outbound sensor signal is reflected off of an obstacle in the external environment of the vehicle, the reflected outbound sensor signal can be received as a return sensor signal;

if a return sensor signal is not received for the outbound sensor signal, determining, using at least a map, whether a hidden obstacle is located along a projected path of the outbound sensor signal;

responsive to determining that a hidden obstacle is located along the projected path of the outbound sensor signal, determining a driving maneuver for the vehicle relative to the hidden obstacle; and causing the vehicle to implement the determined driving maneuver.

2. The method of claim 1, wherein the map is a terrain map, and wherein it is determined that a hidden obstacle is located along the projected path of the outbound sensor signal if the projected path of the outbound sensor signal intersects with a ground surface defined by the terrain map.

3. The method of claim 1, wherein the map is a static obstacle map, and wherein it is determined that a hidden obstacle is located along the projected path of the outbound sensor signal if the projected path of the outbound sensor signal intersects with a static obstacle included in the static obstacle map.

4. The method of claim 1, wherein the outbound sensor signal is a LIDAR sensor signal.

5. The method of claim 1, further including determining at least one of a size or a position of the hidden obstacle, and wherein determining a driving maneuver for the vehicle relative to the hidden obstacle is based at least partially on the determined at least one of the size or the position of the hidden obstacle.

6. The method of claim 1, wherein determining whether a hidden obstacle is located along a projected path of the outbound sensor signal includes:

analyzing the projected path of the outbound sensor signal relative to the map;

if the projected path of the outbound sensor signal intersects with an obstacle defined by the map within a working range of the outbound sensor signal such that a return sensor signal is expected to have been received, then it is determined that a hidden obstacle is located along the projected path of the outbound sensor signal; and if the projected path of the outbound sensor signal does not intersect with an obstacle defined by the map within a working range of the outbound sensor signal such that a return sensor signal is not expected to have been received, then it is determined that a hidden obstacle is not located along the projected path of the outbound sensor signal.

7. A system of detecting hidden obstacles using ray tracing for a vehicle, the system comprising:

a sensor system, the sensor system being configured to transmit an outbound sensor signal into an external environment of the vehicle and to receive return signals, whereby, when the outbound sensor signal is reflected off of an obstacle in the external environment of the vehicle, the reflected outbound sensor signal can be received as a return sensor signal;

one or more data stores including a map;

a processor operatively connected to the sensor system and to the one or more data stores, the processor being configured to:

if a return sensor signal is not received for the outbound sensor signal, determine, using at least a map, whether a hidden obstacle is located along a projected path of the outbound sensor signal;
responsive to determining that a hidden obstacle is located along the projected path of the outbound sensor signal, determine a driving maneuver for the vehicle relative to the hidden obstacle; and
cause the vehicle to implement the determined driving maneuver.

8. The system of claim 7, wherein the map is a terrain map, and wherein it is determined that a hidden obstacle is located along the projected path of the outbound sensor signal if the projected path of the outbound sensor signal intersects with a ground surface defined by the terrain map.

9. The system of claim 7, wherein the map is a static obstacle map, and wherein it is determined that a hidden obstacle is located along the projected path of the outbound sensor signal if the projected path of the outbound sensor signal intersects with a static obstacle included in the static obstacle map.

10. The system of claim 7, wherein the sensor system includes one or more LIDAR sensors, and wherein the outbound sensor signal is a LIDAR sensor signal.

11. The system of claim 7, wherein the sensor system includes one or more cameras configured to acquire visual data of the external environment of the vehicle, wherein the processor is further configured to determine at least one of a size or a position of the hidden obstacle using visual data acquired by the one or more cameras, and wherein determining a driving maneuver for the vehicle relative to the hidden obstacle is based at least partially on the determined at least one of the size or the position of the hidden obstacle.

12. The system of claim 7, wherein determining whether a hidden obstacle is located along a projected path of the outbound sensor signal includes:
analyzing the projected path of the outbound sensor signal relative to the map;
if the projected path of the outbound sensor signal intersects with an obstacle defined by the map within a working range of the outbound sensor signal such that a return sensor signal is expected to have been received, then it is determined that a hidden obstacle is located along the projected path of the outbound sensor signal; and
if the projected path of the outbound sensor signal does not intersect with an obstacle defined by the map within a working range of the outbound sensor signal such that a return sensor signal is not expected to have been received, then it is determined that a hidden obstacle is not located along the projected path of the outbound sensor signal.

13. A method of detecting hidden obstacles using ray tracing for a vehicle, the method comprising:
transmitting a group of at least three outbound sensor signals into an external environment of the vehicle, the group of at least three outbound sensor signals including a first end signal, a second end signal, and an intermediate signal, the intermediate signal being located between the first end signal and the second end signal, whereby, when one of the outbound sensor signals is reflected off of an obstacle in the external environment of the vehicle, the reflected outbound sensor signal can be received as a return sensor signal;
receiving return sensor signals from at least a subset of the group of at least three outbound sensor signals;
if a return sensor signal is received for the first end signal and for the second end signal but a return signal is not received for the intermediate signal, determining, using at least a map, whether a hidden obstacle is located along a projected path of the intermediate signal;
responsive to determining that a hidden obstacle is located along the projected path of the intermediate signal, determining a driving maneuver for the vehicle relative to the hidden obstacle; and
causing the vehicle to implement the determined driving maneuver.

14. The method of claim 13, wherein the map is a terrain map, wherein determining whether a hidden obstacle is located along the projected path of the intermediate signal includes comparing the projected path of the intermediate signal to the terrain map, and wherein it is determined that a hidden obstacle is located along the projected path of the intermediate signal if the projected path of the intermediate signal would intersect with a ground surface defined by the terrain map within a working range of the intermediate signal.

15. The method of claim 13, wherein the map is a static obstacle map, wherein determining whether a hidden obstacle is located along a projected path of the intermediate signal includes comparing the projected path of the intermediate signal to the static obstacle map, and wherein it is determined that a hidden obstacle is located along the projected path of the intermediate signal if the projected path of the intermediate signal would intersects with a static obstacle included in the static obstacle map within a working range of the intermediate signal.

16. The method of claim 13, wherein the group of at least three outbound sensor signals are LIDAR sensor signals.

17. The method of claim 13, further including determining at least one of a size or a position of the hidden obstacle, and wherein determining a driving maneuver for the vehicle relative to the hidden obstacle is based at least partially on at least one of the determined size or the determined position of the hidden obstacle.

18. The method of claim 17, wherein determining at least one of the size or the position of the hidden obstacle is based on visual data of the external environment acquired by one or more cameras.

19. The method of claim 13, wherein determining whether a hidden obstacle is located along a projected path of the intermediate signal includes:
analyzing the projected path of the intermediate sensor signal relative to the map;
if the projected path of the intermediate sensor signal intersects with an obstacle defined by the map within a working range of the intermediate sensor signal such that a return sensor signal is expected to have been received, then it is determined that a hidden obstacle is located along the projected path of the intermediate sensor signal; and
if the projected path of the intermediate sensor signal does not intersect with an obstacle defined by the map within a working range of the intermediate sensor signal such that a return sensor signal is not expected to have been received, then it is determined that a hidden obstacle is not located along the projected path of the intermediate sensor signal.

20. A system of detecting hidden obstacles using ray tracing for a vehicle, the system comprising:
a sensor system, the sensor system being configured to transmit a group of at least three outbound sensor signals into an external environment of the vehicle and to receive return signals, the group of at least three outbound sensor signals including a first end signal, a second end signal, and an intermediate signal, the intermediate signal being located between the first end signal and the second end signal, whereby, when one of the outbound sensor signals is reflected off of an obstacle in the external environment of the vehicle, the reflected outbound sensor signal can be received as a return sensor signal;

a processor operatively connected to the sensor system, the processor being configured to:
if a return sensor signal is received for the first end signal and for the second end signal but a return signal is not received for the intermediate signal, determine, using at least a map, whether a hidden obstacle is located along a projected path of the intermediate signal;
responsive to determining that a hidden obstacle is located along the projected path of the intermediate signal, determine a driving maneuver for the vehicle relative to the hidden obstacle; and
cause the vehicle to implement the determined driving maneuver.

21. The system of claim 20, further including one or more data stores operatively connected to the processor, wherein the map is a terrain map, wherein the one or more data stores include the terrain map, wherein determining whether a hidden obstacle is located along the projected path of the intermediate signal includes comparing the projected path of the intermediate signal to the terrain map, and wherein it is determined that a hidden obstacle is located along the projected path of the intermediate signal if the projected path of the intermediate signal would intersect with a ground surface defined by the terrain map within a working range of the intermediate signal.

22. The system of claim 20, further including one or more data stores operatively connected to the processor, wherein the map is a static obstacle map, wherein the one or more data stores include the static obstacle map, wherein determining whether a hidden obstacle is located along a projected path of the intermediate signal includes comparing the projected path of the intermediate signal to the static obstacle map, and wherein it is determined that a hidden obstacle is located along the projected path of the intermediate signal if the projected path of the intermediate signal intersects with a static obstacle included in the static obstacle map within a working range of the intermediate signal.

23. The system of claim 20, wherein the sensor system includes one or more LIDAR sensors, and wherein the group of at least three outbound sensor signals are LIDAR sensor signals.

24. The system of claim 20, wherein the processor is further configured to determine at least one of a size or a position of the hidden obstacle, and wherein determining a driving maneuver for the vehicle relative to the hidden obstacle is based at least partially on at least one of the determined size or the determined position of the hidden obstacle.

25. The system of claim 24, wherein the sensor system includes one or more cameras configured to acquire visual data of the external environment of the vehicle, wherein determining at least one of the size or the position of the hidden obstacle is based on visual data of the external environment acquired by one or more cameras.

26. The system of claim 20, wherein determining whether a hidden obstacle is located along a projected path of the intermediate signal includes:
analyzing the projected path of the intermediate sensor signal relative to the map;
if the projected path of the intermediate sensor signal intersects with an obstacle defined by the map within a working range of the intermediate sensor signal such that a return sensor signal is expected to have been received, then it is determined that a hidden obstacle is located along the projected path of the intermediate sensor signal; and
if the projected path of the intermediate sensor signal does not intersect with an obstacle defined by the map within a working range of the intermediate sensor signal such that a return sensor signal is not expected to have been received, then it is determined that a hidden obstacle is not located along the projected path of the intermediate sensor signal.

* * * * *